United States Patent
Vorwerk et al.

(10) Patent No.: US 11,881,067 B2
(45) Date of Patent: Jan. 23, 2024

(54) PROCEDURE FOR KEEPING READY FOR COLLECTIVE PARTS AND/OR FOR COLLECTING PARCELED PARTS

(71) Applicants: Felix Vorwerk, Bonn (DE); Matthäus Pruski, Troisdorf (DE)

(72) Inventors: Felix Vorwerk, Bonn (DE); Matthäus Pruski, Troisdorf (DE)

(73) Assignee: Deutsche Post AG, Bonn (DE)

( * ) Notice: Subject to any disclaimer, the term of this patent is extended or adjusted under 35 U.S.C. 154(b) by 600 days.

(21) Appl. No.: 17/132,865

(22) Filed: Dec. 23, 2020

(65) Prior Publication Data

US 2021/0197971 A1 Jul. 1, 2021

(30) Foreign Application Priority Data

Dec. 30, 2019 (DE) ..................... 10 2019 135 888.4

(51) Int. Cl.
*B64D 1/22* (2006.01)
*B64C 39/02* (2023.01)
(Continued)

(52) U.S. Cl.
CPC ....... *G07C 9/00896* (2013.01); *A47G 29/141* (2013.01); *G06Q 10/083* (2013.01);
(Continued)

(58) Field of Classification Search
CPC .............. G07C 9/00896; G07C 9/32; G07C 2009/0092; A47G 29/141; G06Q 10/083; B64U 2201/20
See application file for complete search history.

(56) References Cited

U.S. PATENT DOCUMENTS

2016/0033966 A1  2/2016  Farris et al.
2016/0235236 A1  8/2016  Byers et al.
(Continued)

FOREIGN PATENT DOCUMENTS

CN  106529873 A  3/2017
CN  106886876 A  6/2017
(Continued)

OTHER PUBLICATIONS

DHL Express Press Release Bonn/Guangzhou (China) May 19, 2019: DHL Express Starlet Drohnen-Lieferservice in China. https://www.dpdhl.conn/conntent/dann/dpdhl/de/media-relations/press-releases/2019/pnn-dronen-liefer-service-china-20190516.pdf (recherchiert am Apr. 2, 2021).

*Primary Examiner* — Sisay Yacob
(74) *Attorney, Agent, or Firm* — Reinhart Boerner Van Deuren P.C.

(57) ABSTRACT

A method for holding piece goods to be collected, and/or for gathering together piece goods to be dropped off. At least one piece goods module has a plurality of separate piece goods compartments at a collection point. The piece goods compartments each have a closure device adjustable from a closure position preventing access to the piece goods compartment into an opening position, which opens up access to the piece goods compartment and back. The piece goods module is transported by a drone by air from a distribution base to a transfer point and/or vice versa. The piece goods module is transported by a courier vehicle from the transfer point to the collection point and/or vice versa. At the collection point the at least one piece goods module is secured captively to a docking station and/or is separated from the docking station which is connected to the piece goods module.

9 Claims, 8 Drawing Sheets

(51) Int. Cl.
*G07C 9/00* (2020.01)
*G06Q 10/083* (2023.01)
*A47G 29/14* (2006.01)
*G07C 9/32* (2020.01)

(52) U.S. Cl.
CPC ............ *G07C 9/32* (2020.01); *B64U 2201/20* (2023.01); *G07C 2009/0092* (2013.01)

(56) References Cited

U.S. PATENT DOCUMENTS

| | | | |
|---|---|---|---|
| 2017/0313421 A1* | 11/2017 | Gil | G06Q 10/0832 |
| 2018/0261112 A1* | 9/2018 | O'Brien | G06Q 10/083 |
| 2019/0114578 A1 | 4/2019 | Afordakos | |
| 2019/0347942 A1 | 11/2019 | Kimchi et al. | |
| 2020/0151982 A1* | 5/2020 | Shell | G06Q 10/0832 |

FOREIGN PATENT DOCUMENTS

| | | |
|---|---|---|
| WO | WO 2014/080389 A2 | 5/2014 |
| WO | WO 2014/080389 A8 | 6/2014 |
| WO | WO 2017/190026 A2 | 11/2017 |

\* cited by examiner

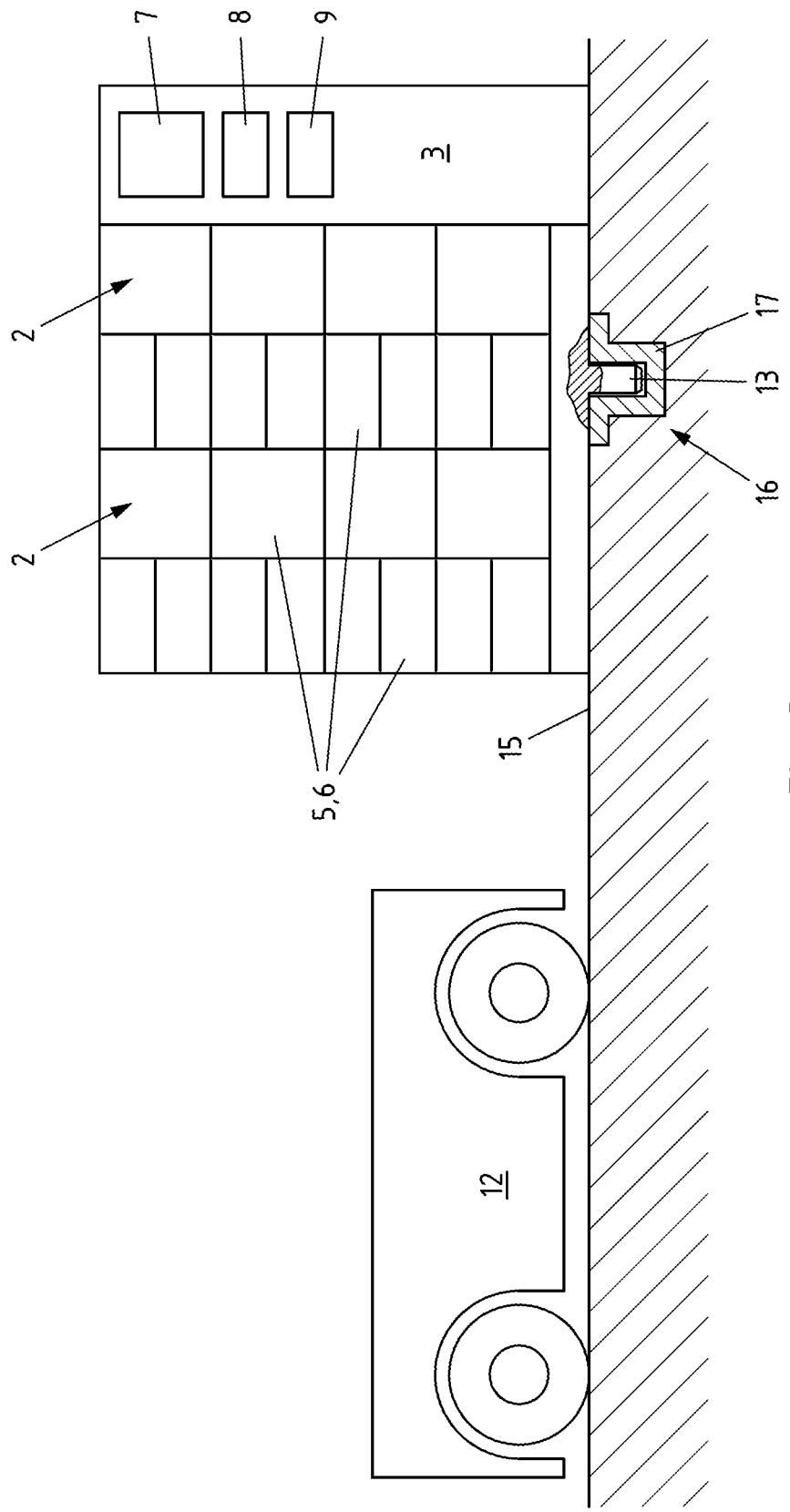

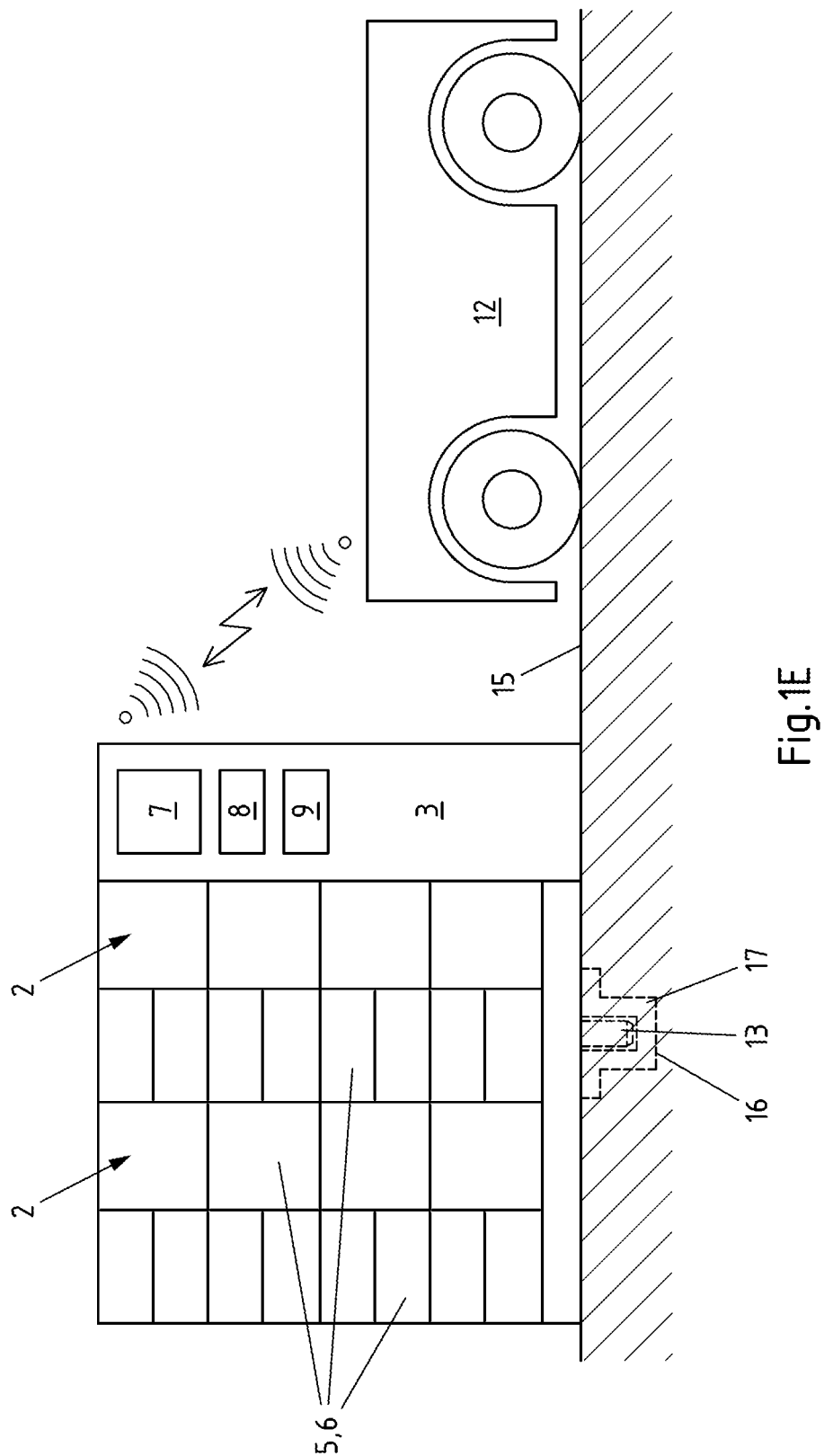

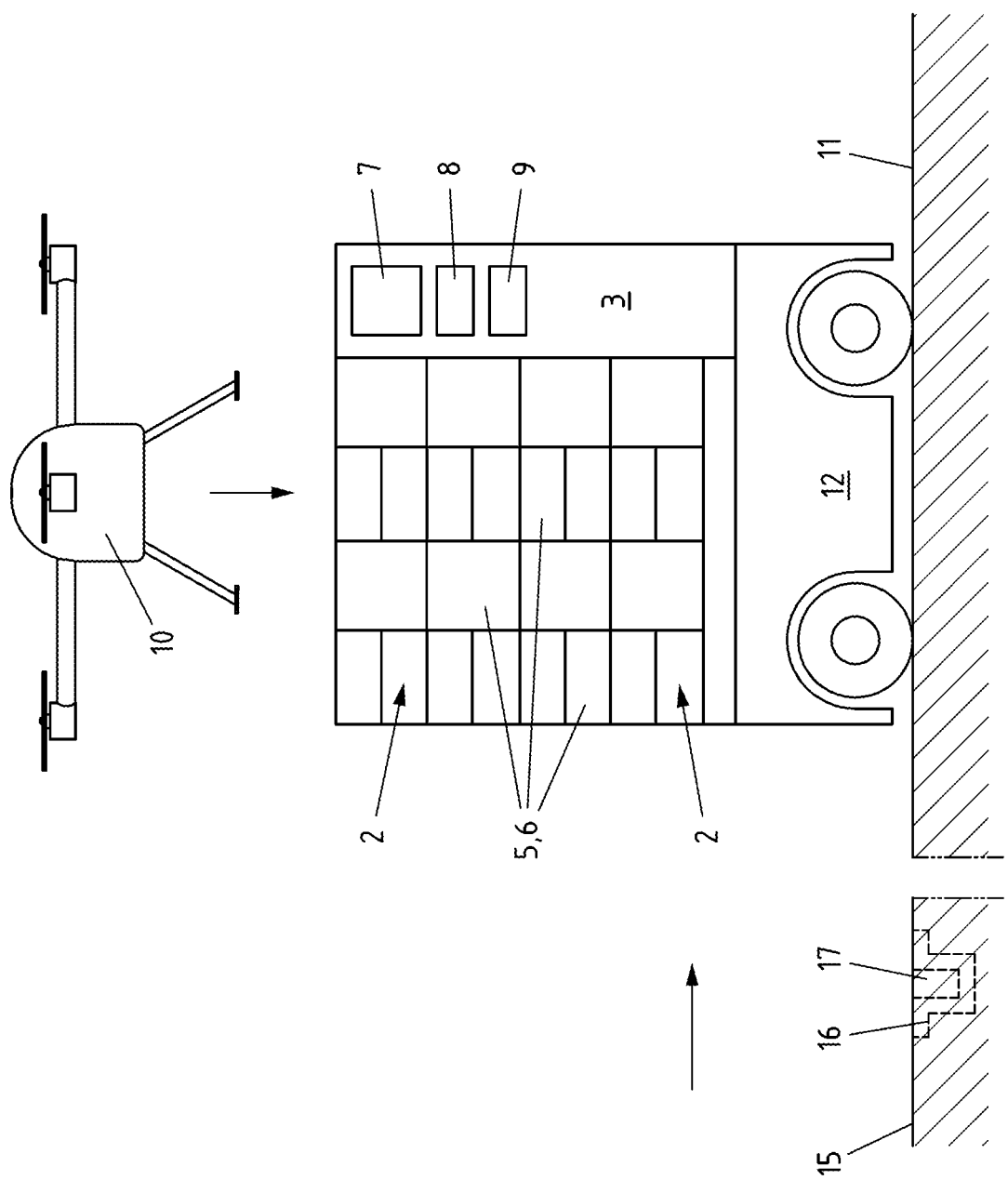

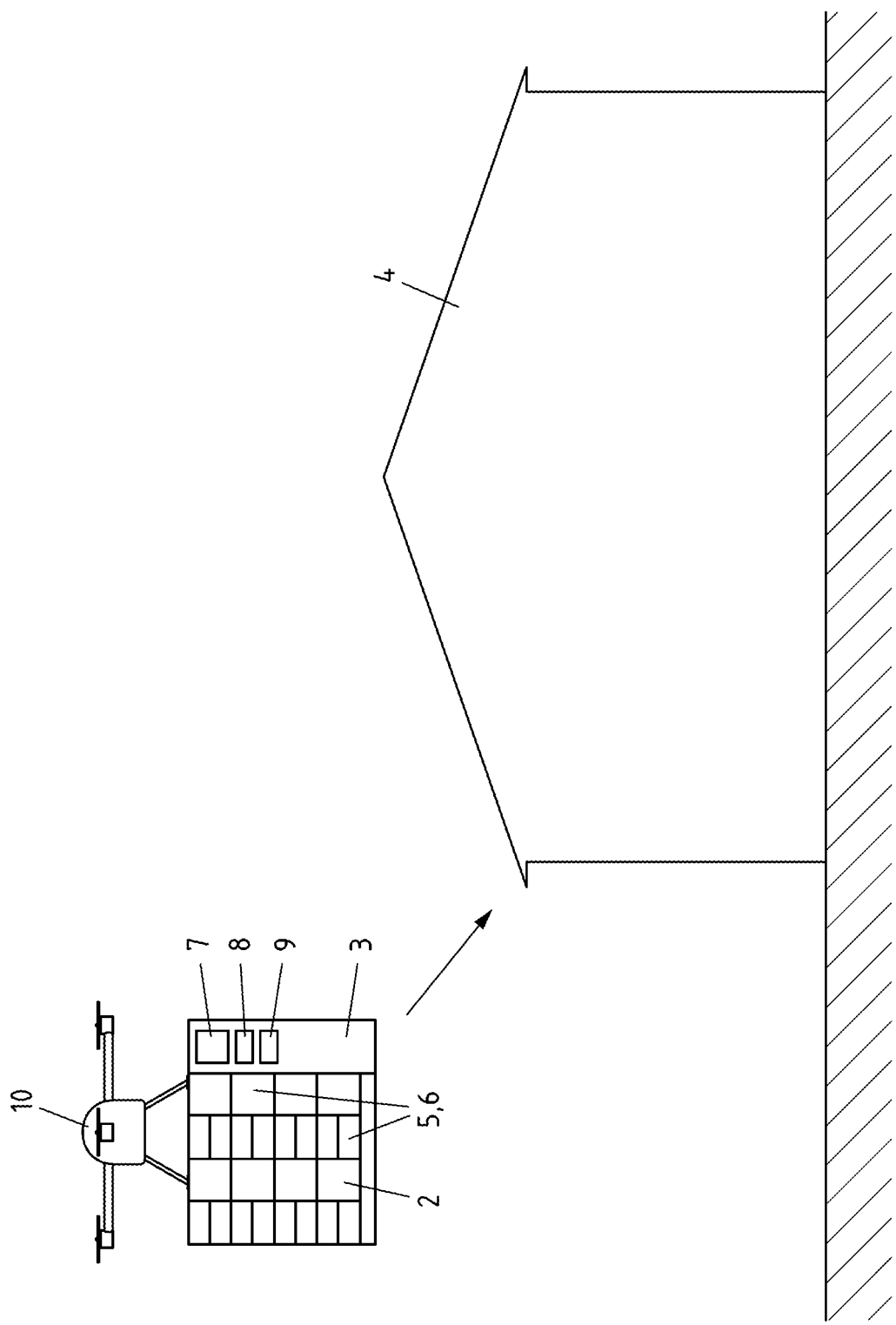

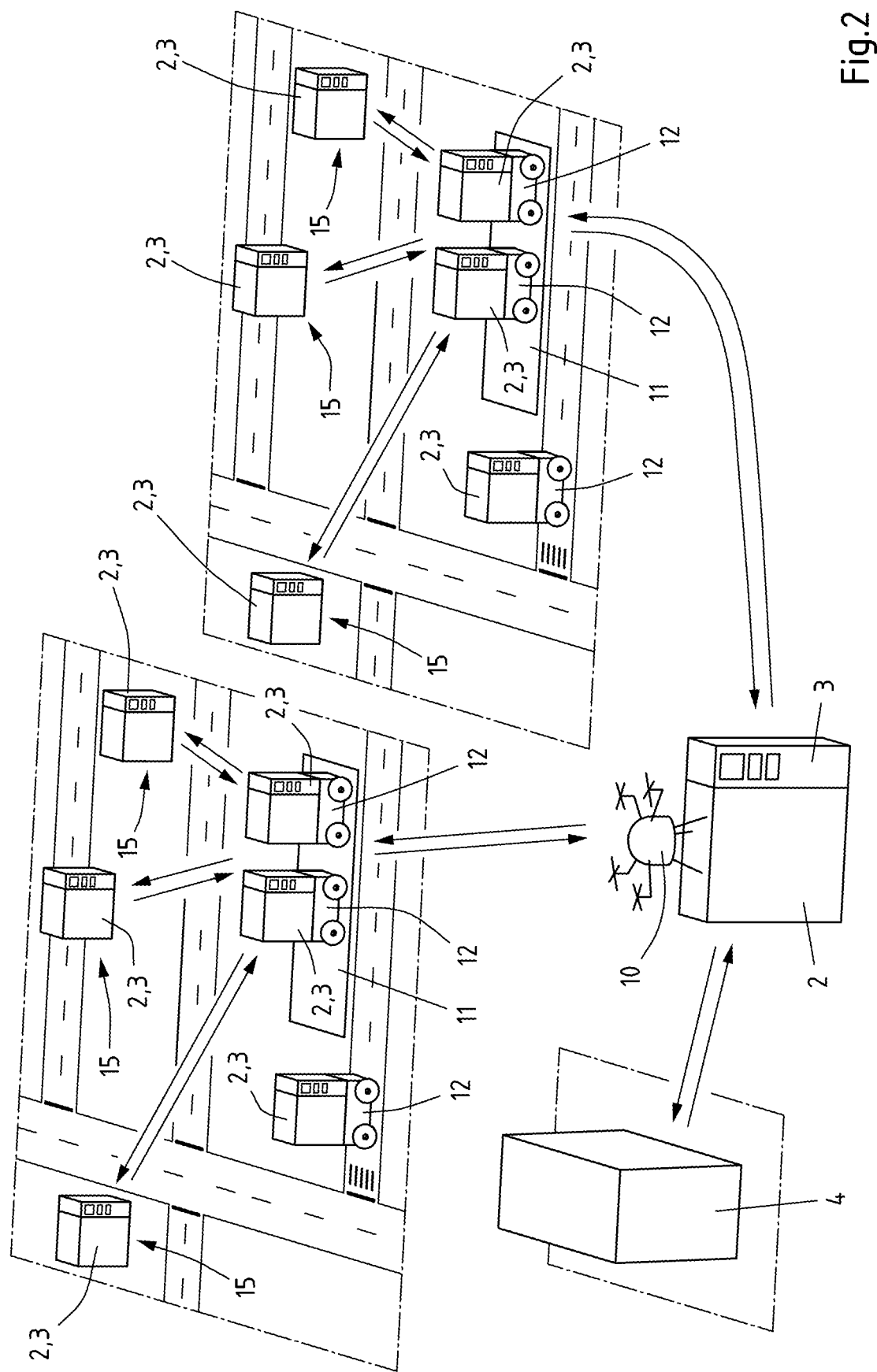

PROCEDURE FOR KEEPING READY FOR COLLECTIVE PARTS AND/OR FOR COLLECTING PARCELED PARTS

CROSS-REFERENCE TO RELATED APPLICATIONS

This patent application claims the benefit of German Patent Application No. 10 2019 135 888.4, filed Dec. 30, 2019, the entire teachings and disclosure of which are incorporated herein by reference thereto.

FIELD OF THE INVENTION

The invention relates to a method for holding piece goods to be collected, and/or for gathering together piece goods to be dropped off, by way of at least one piece goods module, which has a plurality of separate piece goods compartments, at a collection point, wherein the piece goods compartments each have a closure device which is adjustable from a closure position, which prevents access to the piece goods compartment, into an opening position, which opens up access to the piece goods compartment, and back.

Piece goods cabinets having a piece goods module or having multiple piece goods modules which in each case comprise piece goods compartments for receiving piece goods are already known. Here, the piece goods modules may be an integral constituent part of the piece goods cabinet, with the result that the piece goods modules cannot be separated from the piece goods cabinet, or at least cannot be separated therefrom without permanent damage to the piece goods module and/or to the piece goods cabinet. Alternatively, the piece goods modules may however also be connected releasably to the piece goods cabinets, with the result that the piece goods modules can be handled separately from the piece goods cabinets and the piece goods modules of piece goods cabinets may be replaced by or exchanged with other piece goods modules.

The piece goods compartments typically have closure units in the form of doors or flaps, which are able to be adjusted between a closure position and an opening position. In the closure position, it can be ensured that unauthorized persons do not obtain access to an item of piece goods in the piece goods compartment. In the opening position, authorized persons, by contrast, can place piece goods into the piece goods compartment, or remove same from the piece goods compartment.

In order to ensure the operation of the piece goods cabinet by authorized persons, the piece goods cabinet may be designed so that persons authenticate for certain actions. In this regard, the authorized persons can possess for example a key, an ID card, a user name and/or a code for the purpose of authenticating themselves. Other types of access control are conceivable, however. It is also conceivable for no separate access control to be realized at the piece goods cabinet, for example because the piece goods cabinet is already set up in a restricted-access area to which only certain persons obtain any access at all.

The piece goods cabinets of the stated type are preferably, but not necessarily, so-called package stations or the like, into which piece goods, for example in the form of consignments and/or packages, are placed so that they can be collected at a later stage by a person authorized for this purpose. In the case of piece goods, the authorized person may be a customer or an orderer of the item of piece goods. In the case of packages, this may be the addressee of the package. Other piece goods cabinets and/or other uses of the piece goods cabinets are also conceivable, however. It is also conceivable for an item of piece goods to be placed into a piece goods compartment by a customer, said item being intended for further transport to another location. There, the item of piece goods, according to requirements, can be handed over to an authorized person or held in another piece goods cabinet for the purpose of being collected by an authorized person.

Piece goods cabinets of the described type are therefore highly expedient for the providing and dropping-off, by customers or authorized persons, of piece goods at a location which can be visited without any problems by the customers or authorized persons. This is in particular also the case because the collection and/or placement of piece goods in the piece goods cabinet and/or from the piece goods cabinet can be realized virtually at any time of the day and/or on any day of the week.

For example, it is necessary for piece goods, for example in the form of packages, to be transported from a distribution base, in which the piece goods for a specific piece goods cabinet are gathered together, to the piece goods cabinet and/or for the piece goods stored for distribution in the piece goods cabinet to be collected. The collected piece goods are then, according to requirements, transported to the distribution base and, from there, gathered together with other consignments, collected or distributed further.

The provision of piece goods cabinets with piece goods and/or the removal of piece goods from the piece goods cabinets requires a not inconsiderable outlay. Consequently, the handling of the piece goods modules with a satisfactorily low outlay is not yet possible. Also, the alternative transport of piece goods to customers, in particular living in densely populated residential areas, by means of aerial drones has, for various reasons, proven not to be without problems.

BRIEF SUMMARY OF THE INVENTION

The present invention is therefore based on the object of configuring and further developing the method of the type mentioned in the introduction and described in more detail above in such a way that handling of the piece goods modules with a reduced outlay is possible.

Said object is achieved according to Claim 1 by a method for holding piece goods to be collected, and/or for gathering together piece goods to be dropped off, by way of at least one piece goods module, which has a plurality of separate piece goods compartments, at a collection point, wherein the piece goods compartments each have a closure device which is adjustable from a closure position, which prevents access to the piece goods compartment, into an opening position, which opens up access to the piece goods compartment, and back, in which the at least one piece goods module is transported by a drone by air from a distribution base to a transfer point and/or vice versa, in which the at least one piece goods module is transported by a courier vehicle from the transfer point to the collection point and/or vice versa, and in which, at the collection point, the at least one piece goods module is secured captively to a docking station and/or is separated from the docking station, which is connected to the piece goods module via a secured connection.

According to the invention, piece goods are therefore held or gathered together in a piece goods module at a collection point. The piece goods may for example be packaged piece goods, packages or other types of consignments. These are furthermore, for example, collected at the collection point by an authorized person. However, it may alternatively or additionally also be provided that the at least one piece goods module, with the pieces goods gathered together therein, is collected in order for the piece goods module to be transported back to the distribution base according to requirements. Here, the distribution base is, according to requirements, a type of depot, to which the piece goods are transported and in which the piece goods are placed into piece goods compartments of the piece goods modules. Alternatively or additionally, in the distribution base, it is also possible for the piece goods gathered together in the piece goods modules, in particular the piece goods placed by different persons into different piece goods compartments of the at least one piece goods module, to be removed from the piece goods module, in particular the piece goods compartments, and, from the distribution base, distributed to different destinations and/or other distribution bases.

Irrespective of whether the piece goods have been placed into the piece goods compartments at the collection point or in the distribution base, unauthorized access to the piece goods in the piece goods compartments is prevented, so as to avoid damage to or theft of the piece goods provided in the piece goods compartments. Therefore, the piece goods compartments have a closure device, which may be formed for example in the manner of a door or flap. The closure device can be adjusted from a closure position, in which access to the item of piece goods in the corresponding piece goods compartment is prevented, into an opening position and back. In the opening position, access to the item of piece goods in the corresponding piece goods compartment of the at least one piece goods module is opened up. Thus, in the opening position of the closure device, an item of piece goods can be removed from the piece goods compartment of the piece goods module and/or an item of piece goods can be placed into the piece goods compartment of the piece goods module.

The at least one piece goods module is transported by a drone by air from a distribution base to a transfer point. Alternatively or additionally, the at least one piece goods module is transported from a transfer point to a distribution base. If the piece goods module is transported by the drone to the transfer point, then the piece goods module is taken by a courier vehicle to the collection point. If, alternatively or additionally, the at least one piece goods module is flown by the drone from the transfer point to the distribution base, the piece goods module, beforehand, was moved by a courier vehicle from the collection point to the transfer point.

In order that the piece goods module cannot be stolen by unauthorized persons at the collection point, the at least one piece goods module is secured captively to a docking station at the collection point. In other words, the at least one piece goods module is connected fixedly to the docking station at the collection point, wherein this connection is basically formed to be releasable in order for the piece goods module to be removed again. However, this connection is secured, so that the connection cannot be separated by everybody or readily. The securing means can also be easily and quickly opened or bypassed if an authorized person or a device designed for this purpose is appropriately equipped. Corresponding securing means are known here in a wide variety of configurations. Alternatively or additionally, for the securing of the piece goods module, the secured connection between the docking station and the at least one piece goods module, according to the invention, may however also be separated again.

Consequently, the piece goods can be transported very quickly and in an uncomplicated manner back and forth between the distribution base and the transfer point in that use is made of the at least one piece goods module and the at least one drone. Moreover, the piece goods can be transported very quickly and in an uncomplicated manner back and forth between the transfer point and the collection point in that use is made of the at least one piece goods module and the at least one courier vehicle. Otherwise, it would be necessary for example for a courier to travel in his or her courier vehicle through public road traffic from the distribution base to the collection point and, there, to transfer the piece goods from the courier vehicle into the piece goods compartments of the piece goods module. This is cumbersome in particular if the routes of the courier vehicle are subject to congestion. Since, according to the invention, the courier vehicles cover only relatively short distances from the transfer point to the collection point, public road traffic constitutes barely any restriction. Moreover, there is not the problem of limited air space, which would exist if the drones were to fly directly to the collection point. Specifically, the transfer point may be selected without any problem in such a way that drones can easily land there and the courier vehicles can easily collect the piece goods modules there or bring them there.

Also, different piece goods modules can easily be distributed to different collection points from a transfer point. It is therefore not necessary for a separate transfer point to be provided for each collection point. Here, a drone may, according to requirements, transport two or more piece goods modules at the same time. However, the one drone may transport different piece goods modules one after the other. It is also conceivable, however, that different piece goods modules are flown by multiple drones, at the same time if required, to the transfer point and/or to the distribution base. Irrespective of this, the piece goods modules can be transported by one or more courier vehicles to the collection point and/or to the transfer point. In this way, the method described can be adapted in a very simple and flexible manner to different requirements and local conditions.

In a first particularly preferred configuration of the method, the at least one piece goods module, which is transported by a drone by air from a distribution base to a transfer point and/or vice versa, is in a state loaded with piece goods, in particular in the piece goods compartments. In this way, together with the piece goods module, piece goods can also be transported from the distribution base to the transfer point and/or the other way round. If, for example, piece goods modules are transported back to the distribution base for the purpose of being loaded again in the distribution base, it is possible in this way for further piece goods, to be distributed, to be simultaneously carried to the distribution base.

Alternatively or additionally, the at least one piece goods module, which is transported by a courier vehicle from the transfer point to the collection point and/or vice versa, may be in a state loaded with piece goods, wherein the piece goods may be accommodated in particular in the piece goods compartments. In this way, together with the piece goods module, piece goods can also be transported from the transfer point to the collection point and/or the other way round. If, for example, piece goods modules are transported back to the distribution base for the purpose of being loaded again in the distribution base, it is possible in this way for further piece goods, to be distributed, to be simultaneously carried to the distribution base.

In this context, it is furthermore expedient if, at the collection point, the at least one piece goods module, which is loaded with piece goods and has piece goods compartments, is secured captively to a docking station. Alternatively or additionally, at the collection point, the at least one piece goods module, which is loaded with piece goods and has piece goods compartments, may be separated from the docking station, which is connected to the piece goods module via a secured connection. Consequently, during this time, the piece goods may remain in the piece goods compartments.

It is moreover particularly expedient if the at least one piece goods module, which, according to requirements, is loaded with piece goods and has piece goods compartments, is transported by a drone by air from a distribution base to a transfer point, and/or vice versa, in an autonomous manner. In this way, it is possible not only for a saving to be achieved in terms of personnel, but also for use to made of drones which are particularly small and therefore easy to land at the transfer point. Not least, as a result of autonomous drones, a highly flexible method implementation is possible.

In order that the piece goods modules and thus the piece goods cannot fall into the hands of unauthorized persons, it is preferably provided that the secured connection between the at least one piece goods module and the docking station is released for separation, or separated, by way of authentication. The piece goods module can be separated from the docking station only if an authentication has been successfully completed. Additionally, it may then be provided that the authentication is realized through transmission of at least one piece of authorization information to the docking station. The at least one piece of authorization information may in this case be transmitted to the docking station for example from a courier, a courier vehicle and/or a control center. Here, the control center may be provided for the central control of the method, for which purpose provision of the control center at either the collection point or the transfer point, or in the distribution base, is not necessary. The communication may in this case be transmitted for example via radio, in particular mobile radio, or via a data line. Alternatively or additionally, the at least one piece of authorization information may be detected through reading of the authorization information of a courier and/or a courier vehicle by the docking station. The authorization information is then stored, for example as a 2D barcode, for example in a storage medium. Alternatively or additionally, the security device may however also be unlocked by way of a key unit.

In order to reduce the outlay for the implementation of the method, it may be expedient if, as a courier vehicle, use is made of an autonomously driving courier bot. In this case, the method can also be applied in a very much more flexible manner. For example, adaptation to specific local conditions is possible very easily and quickly through the use of courier bots.

For the sake of simplicity, the docking station may be a docking station which is anchored fixedly, in particularly non-releasably, in the ground. It is however then simply possible at the same time for the at least one piece goods module to be reliably anchored at the collection point, so as to prevent theft of the piece goods module. Alternatively or additionally, as a docking station, use may be made of a piece goods cabinet which is anchored, in particular non-releasably, in the ground. The at least one piece goods module or, according to requirements, a plurality of piece goods modules, can however also then be received in the piece goods cabinet.

A transfer of the at least one piece goods module to the courier vehicle that is particularly efficient, quick and protected against potential manipulation can be achieved if the at least one piece goods module is set down onto the courier vehicle by the drone. A particular simple and reliable transfer of the at least one piece goods module to the courier vehicle can furthermore be achieved if the courier vehicle drives beneath the at least one piece goods module at the transfer point.

For simplification of the method, the piece goods module may be formed as an in particular integral constituent part of a piece goods cabinet. Then, beside the provision of a piece goods module with the piece goods compartments, there is integrated in the piece goods cabinet the further functionality of the piece goods cabinet. In addition to the one piece goods module, there may be provided for example an operating device, a control device and/or an authentication device. This also simplifies, according to requirements, the anchoring of the piece goods module or the piece goods cabinet at the collection point. Alternatively, it would be possible for a piece goods cabinet unit of the piece goods cabinet, for example comprising an operating device, a control device and/or an authentication device, to be anchored at the collection point, with the result that then, for completion of the piece goods cabinet, the at least one piece goods module additionally has to be anchored in a secured manner in the piece goods cabinet unit.

Consequently, in this configuration of the method, the piece goods cabinet is transported by a drone by air from a distribution base to a transfer point and/or vice versa. Additionally, the piece goods cabinet is transported by a courier vehicle from the transfer point to the collection point and/or vice versa, and, at the collection point, the piece goods cabinet is secured captively to a docking station and/or is separated from the docking station, which is connected to the piece goods cabinet via a secured connection.

BRIEF DESCRIPTION OF THE DRAWINGS

The invention will be explained in more detail below on the basis of a drawing which illustrates merely exemplary embodiments. In the drawing FIGS. 1A-G show, in schematic illustrations, individual method steps of a method for holding piece goods to be collected, and for gathering together piece goods to be dropped off, at a collection point by way of a piece goods module, and FIG. 2 shows, in a schematic illustration, a distribution principle to be realized using the method as per FIG. 1.

DETAILED DESCRIPTION

Figure 1A:
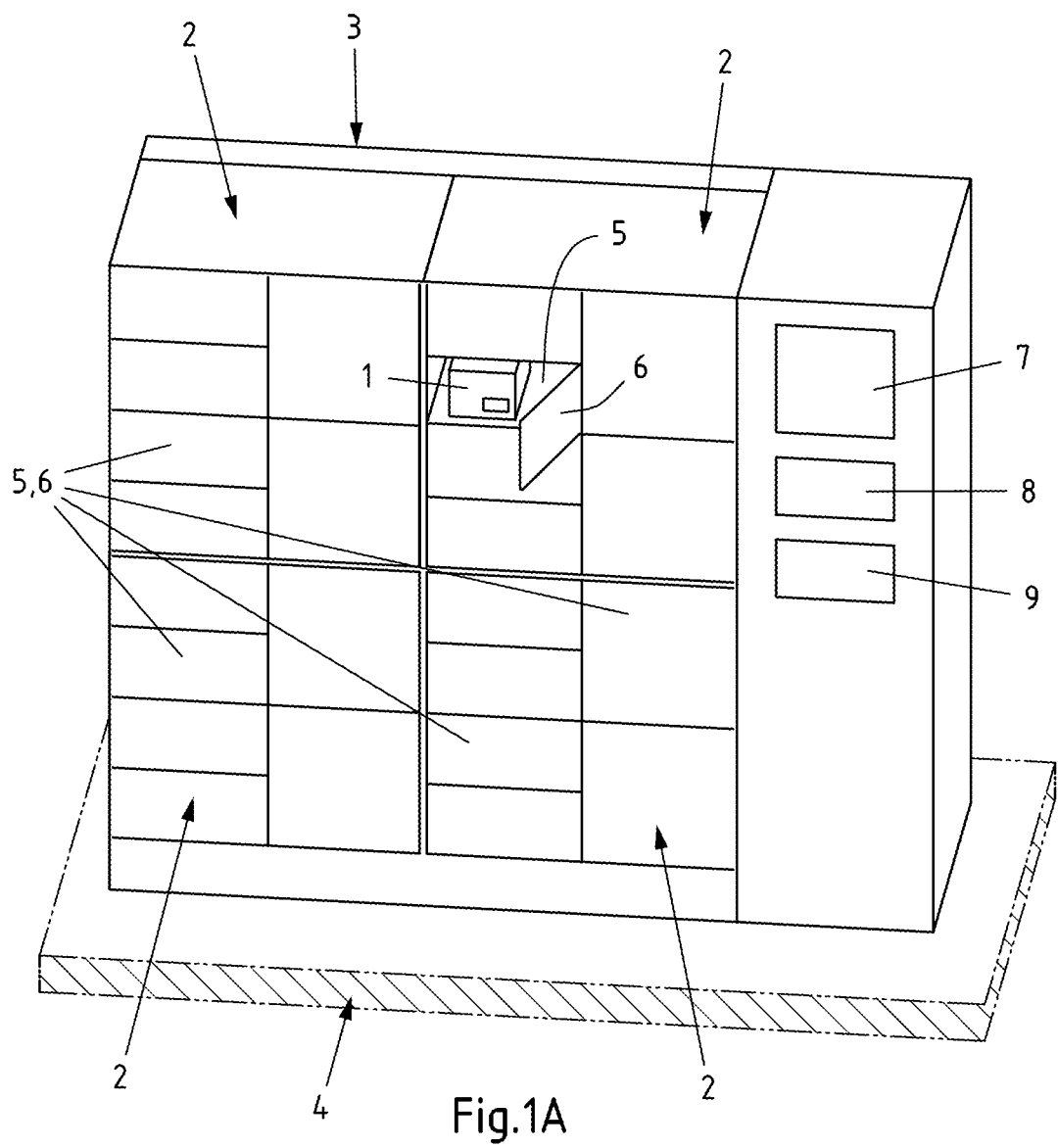

FIGS. 1A-G schematically illustrate a method for holding piece goods 1 to be collected, and for gathering together piece goods 1 to be dropped off, at a collection point by way of a piece goods module 2 in the form of an integral constituent part of a piece goods cabinet 3, which is provided in a distribution base in FIG. 1A. First of all, the piece goods module 2 is loaded with piece goods 1 in a distribution base 4. Here, typically, piece goods 1 are placed individually into piece goods compartments 5 of the piece goods module 2. The piece goods 1 are typically intended for collection by different collectors at the collection point. In order that the respective piece goods 1 are able to be collected only by the respective collectors or persons appointed by the collectors, the piece goods compartments 5 are closed off by closure devices 6 after the placement of the piece goods 1 into the piece goods compartments. Here, the closure devices 6 are in the form of flaps which are able to be pivoted to the side from a closure position, which closes off the piece goods compartment 5, into an opening position, which opens up access to the piece goods compartment 5. After the placement of an item of piece goods 1 into a piece goods compartment 5, the closure device 6 can be pivoted back into the closure position again and, there, locked. Beside the piece goods compartments 5 of the piece goods module 2, the piece goods cabinet 3 comprises an operating device 7 for the operation of the piece goods cabinet 3, for example by a collector, a control device 8, for example for locking and releasing closure devices 6 of specific piece goods compartments 5, and an authentication device 9 for authentication of a collector. Here, the authentication of a collector can, together with the control device 8, ensure that only the piece goods compartment 5 in which the item of piece goods 1 intended for the collector was originally placed is opened.

Figure 1B:
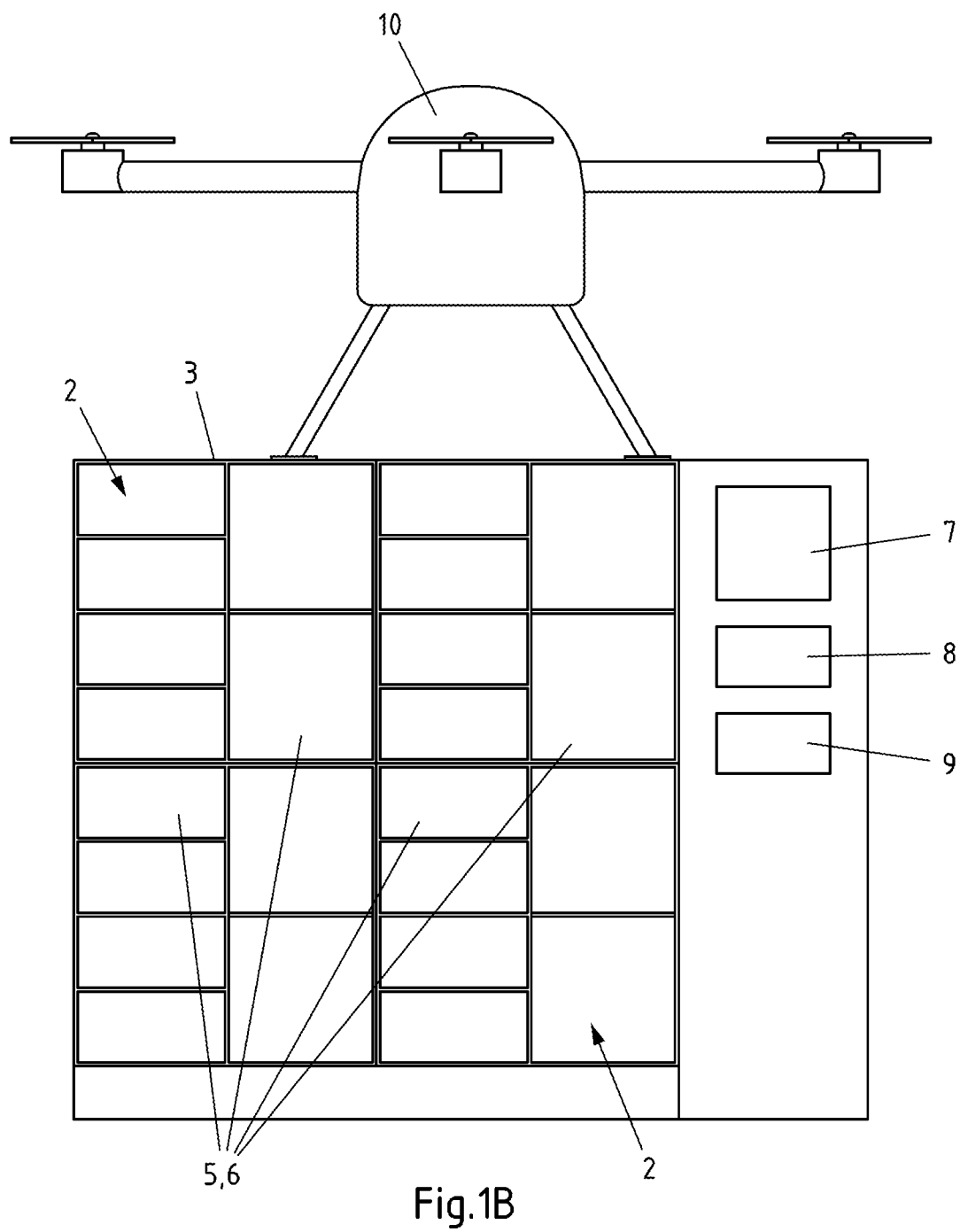
Figure 1C:
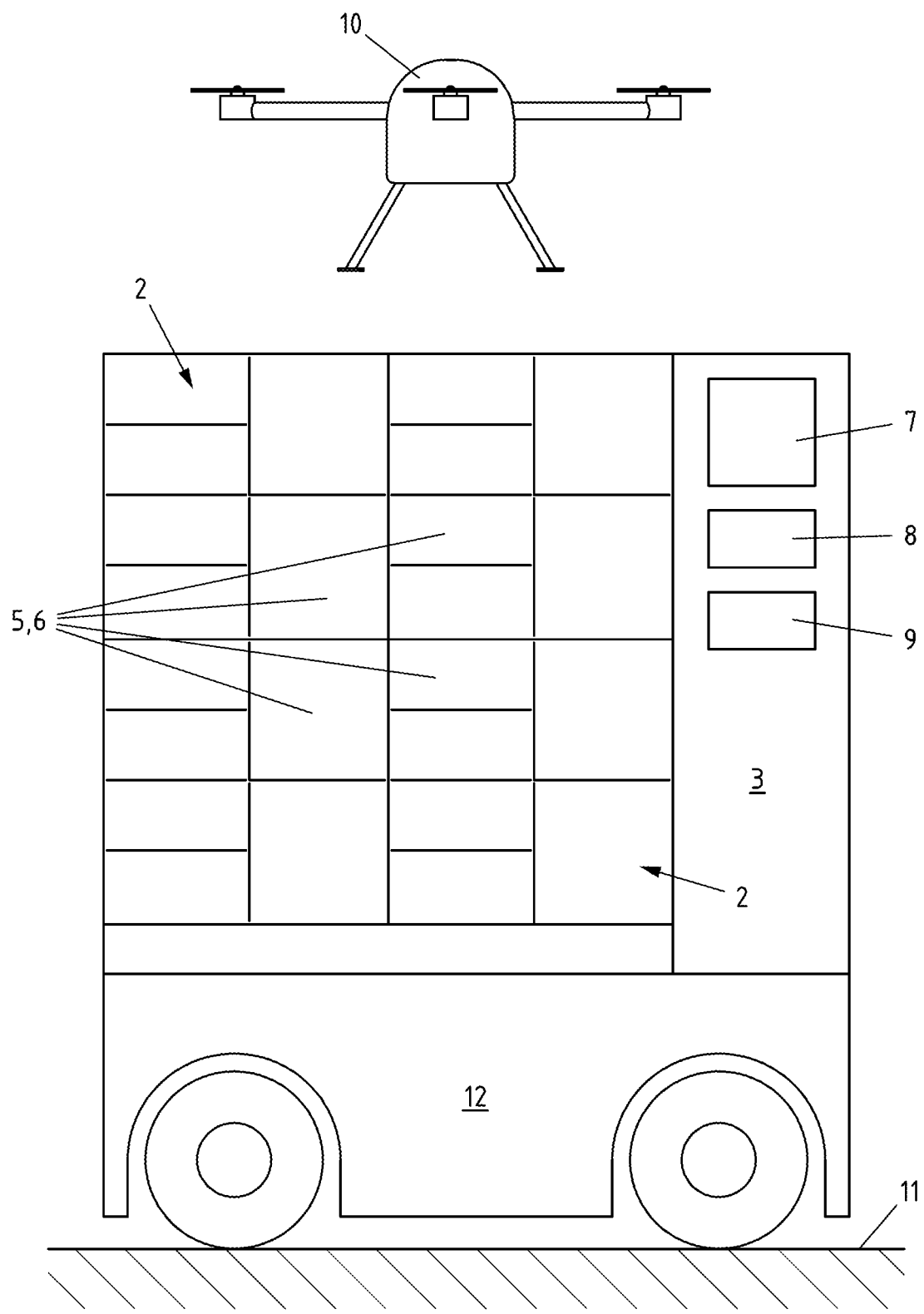

As is illustrated in FIG. 1B, after being loaded with piece goods 1, the piece goods module 2 is taken hold of by a drone 10 and flown to a transfer point 11. There, the drone 10 sets the piece goods module 2 down onto an autonomously driving courier vehicle 12 which is waiting there, as is illustrated in FIG. 1C. The courier vehicle 12 then moves the piece goods module 2 autonomously from the transfer point 11 to the collection point 15. At the collection point 15, the courier vehicle 12 sets the piece goods module 2 onto a docking station 16, as is illustrated in FIG. 1D. The docking station 16 comprises for this purpose a receiving part 17, into which a pin 13 of the piece goods module 2 engages upon being set down. Here, the pin 13 is secured in the receiving part 17 of the docking station 16, with the result that the piece goods module 2 cannot be readily pulled out of the receiving part 17. Other secured connections between the piece goods module 2 and the docking station 16 would also be conceivable here. It would also be conceivable for the docking station to have a pin which engages into a receiving part of the consignment module.

It is then possible for a collector to authenticate at the collecting point 15 via the operating device 7, the authentication device 9 and the control device 8 on the piece goods cabinet 3. The control device 8 subsequently opens the piece goods compartment 5 in which the item of piece goods 1 intended for the specific collector has been placed. The collector or a deliverer can also authenticate via the operating device 7, the authentication device 9 and the control device 8 on the piece goods cabinet 3 and allow an empty piece goods compartment 5 to be opened. The collector can then place an item of piece goods 1 into the open piece goods compartment 5 and close the piece goods compartment 5 again.

A courier vehicle 12 travels to the piece goods module 2 or to the piece goods cabinet 3 for example after the piece goods 1 to be collected have been removed from the piece goods module 2 and/or after other piece goods 1 have been placed into the empty piece goods compartments 5. After arriving at the piece goods module 2 or at the piece goods cabinet 3, the courier vehicle 12 is authenticated, with the result that the secured connection between the docking station 16 and the piece goods module 2 or the piece goods cabinet 3 is released for separation, as is illustrated in FIG. 1E. Subsequently, the courier vehicle 12 takes the piece goods module 2 or the piece goods cabinet 3. The courier vehicle 12 then moves the piece goods module 2 or the piece goods cabinet 3, as is illustrated in FIG. 1F, back to the transfer point 11 or else, according to requirements, to another transfer point 11. There, the piece goods module 2 or the piece goods cabinet 3 is again transferred to a drone 10, which flies the piece goods module 2 or the piece goods cabinet 3 back to a distribution base 4, as is illustrated in FIG. 1G. One distribution base 4 is in particular the distribution base 4 in which the piece goods module 2 or the piece goods cabinet 3 was first loaded with piece goods 1. There, the filled piece goods compartments 5 are emptied and the corresponding piece goods 1 are distributed further. The above-described method can then be performed again.

Here, as is illustrated in FIG. 2, multiple transfer points 11 can be flown to by the drones 10, with piece goods module 2 or piece goods cabinet 3 included, from a distribution base 4. Moreover, multiple collection points 15 can be driven to by the courier vehicles 12 from each transfer point 11. Here, the courier vehicles 12 preferably move the piece goods modules 2 or piece goods cabinets 3 back again to the transfer point 11 from which the piece goods modules 2 or the piece goods cabinets 3 were distributed to the collection points 15. There, the piece goods modules 2 or piece goods cabinets 3 are flown by means of drones 10 back again to the distribution base 4 in which the piece goods modules 2 or the piece goods cabinets 3 were originally loaded with piece goods 1.

LIST OF REFERENCE SIGNS

1 Item of piece goods
2 Piece goods module
3 Piece goods cabinet
4 Distribution base
5 Piece goods compartment
6 Closure device
7 Operating device
8 Control device
9 Authentication device
10 Drone
11 Transfer point
12 Courier vehicle
13 Pin
15 Collection point
16 Docking station
17 Receiving part

The invention claimed is:

1. A method for holding piece goods (1) to be collected, and/or for gathering together piece goods (1) to be dropped off, by way of at least one piece goods module (2), which has a plurality of separate piece goods compartments (5), at a collection point (15), wherein the piece goods compartments (5) each have a closure device (6) which is adjustable from a closure position, which prevents access to the piece goods compartment (5), into an opening position, which opens up access to the piece goods compartment (5), and back, in which the at least one piece goods module (2) is transported by a drone (10) by air from a distribution base (4) to a transfer point (11) and/or vice versa, in which the at least one piece goods module (2) is transported by a courier vehicle (12) from the transfer point (11) to the collection point (15) and/or vice versa, and in which, at the collection point (15), the at least one piece goods module (2) is secured captively to a docking station (16) and/or is separated from the docking station (16), which is connected to the piece goods module (2) via a secured connection.

2. The method according to claim 1,
in which the at least one piece goods module (2), which has piece goods compartments (5) loaded with piece goods (1), is transported by a drone (10) by air from a distribution base (4) to a transfer point (11) and/or vice versa, and/or
in which the at least one piece goods module (2), which has piece goods compartments (5) loaded with piece goods (1), is transported by a courier vehicle (12) from the transfer point (11) to the collection point (15) and/or vice versa.

3. The method according to claim 2,
in which, at the collection point (15), the at least one piece goods module (2), which has piece goods compartments (5) loaded with piece goods (1), is secured captively to a docking station (16) and/or is separated from the docking station (16), which is connected to the piece goods module (2) via a secured connection.

4. The method according to claim 1,
in which the at least one piece goods module (2), which, according to requirements, has piece goods compartments (5) loaded with piece goods (1), is transported by a drone (10) by air from a distribution base (4) to a transfer point (11), and/or vice versa, in an autonomous manner.

5. The method according to claim 1,
in which the secured connection between the at least one piece goods module (2) and the docking station (16) is released for separation, or separated, by way of authentication, and
in which, preferably, the authentication is realized through transmission of at least one piece of authorization information to the docking station (16) from a courier, a courier vehicle (12) and/or a control center and/or through reading of an item of authorization information of a courier and/or a courier vehicle (12) and/or through unlocking of a security device by way of a key unit.

6. The method according to claim 1, in which, as a courier vehicle (12), use is made of an autonomously driving courier bot.

7. The method according to claim 1, in which, as a docking station (16), use is made of a docking station (16) which is anchored fixedly, in particular non-releasably, in the ground and/or a piece goods cabinet (3) which is anchored, in particularly non-releasably, in the ground for receiving at least one piece goods module (2).

8. The method according to claim 1,
in which the at least one piece goods module (2) is set down onto the courier vehicle (12) by the drone (10), and/or
in which a courier vehicle (12) drives beneath the at least one piece goods module (2) at the transfer point (11).

9. The method according to claim 1,
in which the piece goods module (2) is an in particular integral constituent part of a piece goods cabinet (3), and
in which the piece goods cabinet (3) is transported by a drone (10) by air from a distribution base (4) to a transfer point (11) and/or vice versa,
in which the piece goods cabinet (3) is transported by a courier vehicle (12) from the transfer point (11) to the collection point (15) and/or vice versa, and
in which, at the collection point (15), the piece goods cabinet (3) is secured captively to a docking station (16) and/or is separated via a secured connection between the piece goods cabinet (3) and the docking station.

* * * * *